May 13, 1930.　　　　　E. HAMEL　　　　　1,758,110
BABY CARRIAGE
Filed June 13, 1928　　　3 Sheets-Sheet 1
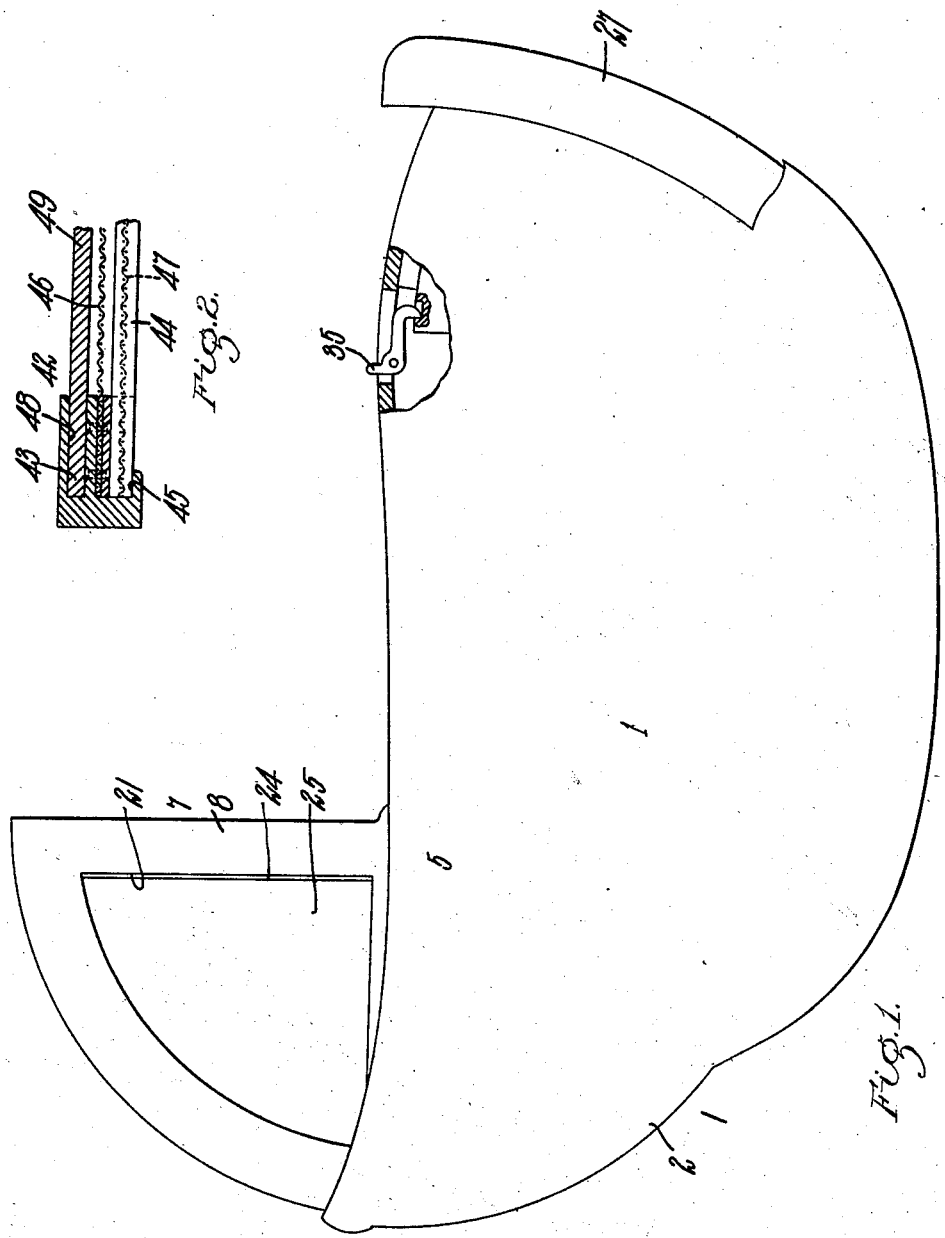

May 13, 1930. E. HAMEL 1,758,110
BABY CARRIAGE
Filed June 13, 1928 3 Sheets-Sheet 2
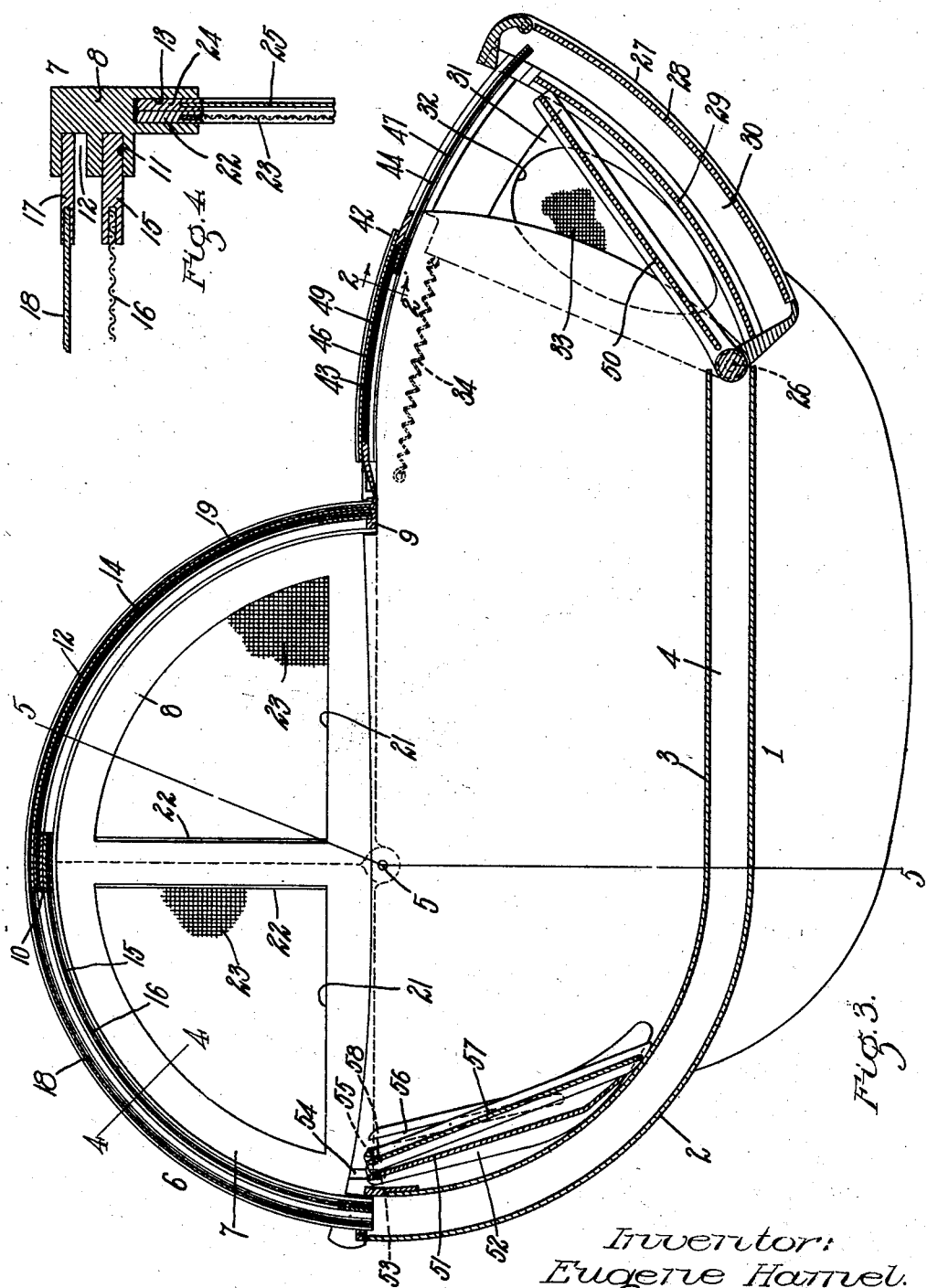

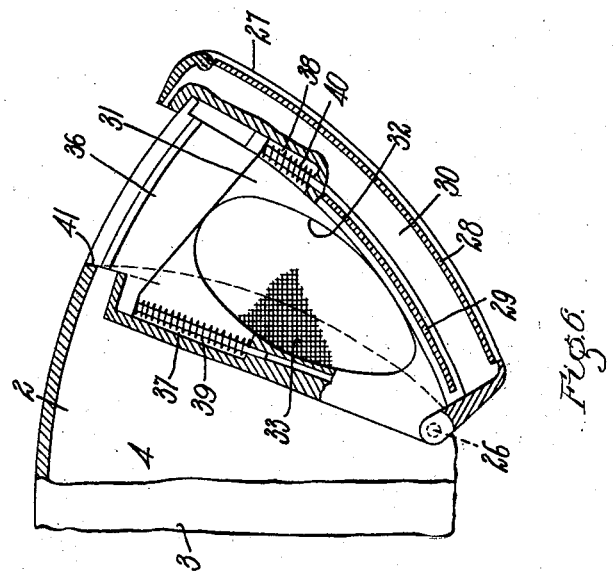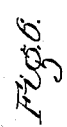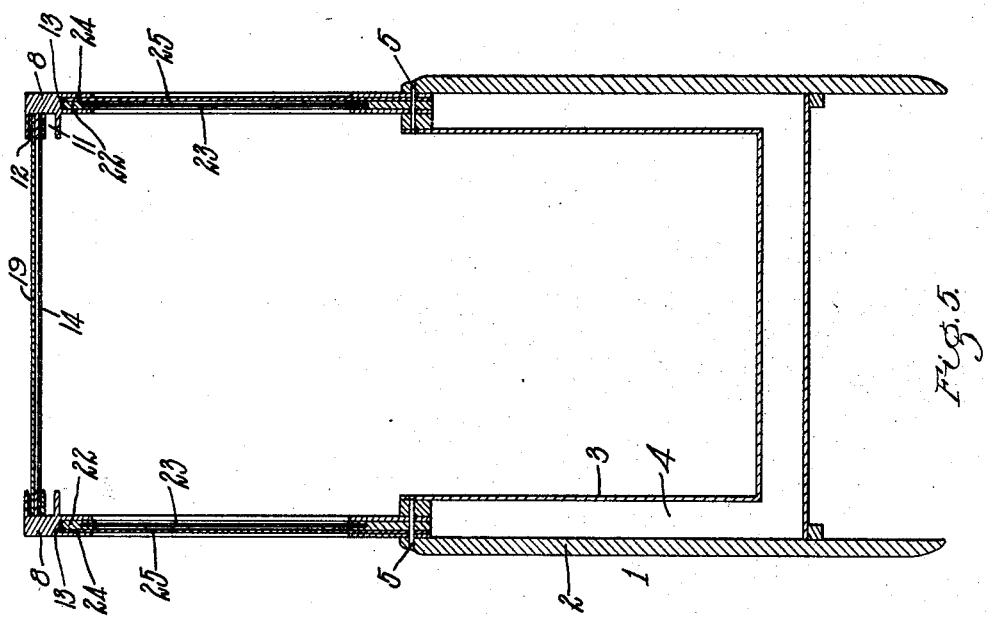

Patented May 13, 1930

1,758,110

UNITED STATES PATENT OFFICE

EUGENE HAMEL, OF BROCKTON, MASSACHUSETTS

BABY CARRIAGE

Application filed June 13, 1928. Serial No. 285,146.

This invention relates to improvements in baby carriages, and has for its object to so construct the body portion of a baby carriage that the occupant thereof can receive all of the advantages that can be obtained from being exposed to fresh air and sunlight and at the same time be protected from drafts of air, rain and overexposure to the sun, and also from insects, such as flies, mosquitoes and the like.

The invention contemplates in its construction the employment of a hood embodying therein a plurality of slides having either an open mesh fabric such as wire screen, or a transparent material such as isinglass or celluloid, or a suitable waterproof material fastened thereto, and said slides may be adjusted within the hood for the protection of the occupant in any manner desired.

Another object of the invention is to provide an extension for the front of the baby carriage, said extension being so pivoted to the body member that it may be opened to permit air to enter said body member at the front thereof.

Still another object of the invention is to provide protection for the upper forward portion of the baby carriage, this protecting means consisting of a plurality of members having either wire screen material fastened thereto, or a rain and wind proof material, and these members may all be moved relatively to each other to obtain the protection desired.

The invention consists in a baby carriage as set forth in the following specification and particularly as pointed out in the claims thereof.

Referring to the drawings:

Figure 1 represents a side elevation of a baby carriage body embodying my invention, the hood being shown partly open and the extension for the front being shown closed.

Fig. 2 is an enlarged detail section taken on the line 2—2 of Fig. 3.

Fig. 3 is a central vertical section taken lengthwise of the baby carriage, the hood portion thereof being shown in its closed position and the extension for the front being located in its open position.

Fig. 4 is an enlarged detail section taken on the line 4—4 of Fig. 3.

Fig. 5 is a transverse section taken on the line 5—5 of Fig. 3.

Fig. 6 is a sectional view illustrating the mechanism for holding the front extension for the baby carriage in its open position.

Like numerals refer to like parts throughout the several views of the drawings.

In the drawings, 1 represents the body member of a baby carriage, said body member consisting of an outer wall 2 and an inner wall 3 between which is a space 4. Pivotally mounted at 5 to the body member 1 is a hood 6, the latter embodying therein a frame 7 having side members 8 which are connected together to move in unison by means of cross members 9 and 10, see Fig. 3.

The general contour of the hood 6 is semi-cylindrical and the space 4 of the body member 1 is so formed that the hood may be moved from its open position shown in Fig. 3, into a position where it will be located entirely within the body member, at which time the entire top of the body member will be open.

Located upon the inner face of both of the side members 7 are semi-annular grooves 11 and 12, the corresponding grooves of both frames being located opposite each other. Another groove 13 arcuate in form is provided upon each of the side members 8 of the frame 7. Permanently secured to the cross members 9 and 10 is a piece of open mesh fabric 14, such, for example, as wire screen material, and this material preferably covers approximately one-half of the circumferential portion of the hood 6.

Slidably mounted within the oppositely disposed grooves 11 of the side members 8 is an arcuate slide 15 to which a piece of screen wire 16 is fastened. The slide 15 may be located in the position shown in Fig. 3, or it may be moved into a position adjacent to and parallel with the wire screen 14. Located within the opposite grooves 12 of the side members 8 is an arcuate slide 17 to which a transparent covering 18, such for example as isinglass, transparent celluloid, or any other suitable material is secured. Also located within the grooves 12 is an arcuate slide 19 having a suitable waterproof material fastened thereto. The slides 17 and 19 may both be moved as desired within the groove 12 to be located adjacent to and parallel with the permanent wire screen 14, or parallel to the slide 15 when the latter is located in the position in which it is illustrated in Fig. 3.

Located upon both sides of the hood 6 and formed in the side members 8 of the frame 7 are openings 21, and located within the groove 13 in a position to normally close said openings are slides 22 and 24, the former having wire screen material 23 thereon and the slide 24 having a waterproof material 25 thereon. The slides 22 and 24 are furthermore pivoted upon the hood 6 at 5 and may be moved either singly or jointly in the groove 13 to uncover the openings 21 or to provide a ventilated protection at said opening by using the wire screen 23, or to provide a protection against drafts or stormy weather by employing the waterproof material 25.

Pivoted at 26 to the body member 1 is an extension 27 for the front of said body member and said extension embodies therein a front wall 28 and a rear wall 29 between which is a space 30. Side portions 31 of the extension 27 have openings 32 extending therethrough, and said openings are covered with screen material 33. A spring 34 is connected with each of the side portions 31 and acts to normally hold the extension 27 in its closed position, at which time the latch 35 interlocks with the upper edge of each side portion 31 and positively holds the extension 27 closed. The extension 27 is held open by members 36 that are yieldingly mounted in the side portions 31 in which they are slidable in grooves 37 and 38. Springs 39 and 40 engage the lower edge of the yielding members 36 and act to hold the latter in their raised position when the extension 27 is open, at which time a rear edge portion 41 of each yielding member engages a front edge portion of the body member 1, as illustrated in Fig. 6.

An extensible covering 42 is provided for the upper forward portion of the body member 1 or that portion of said body member that cannot be protected by the hood 6, said covering consisting of slide members 43 and 44, the latter slide being mounted to slide in guideways 45 provided upon the former slide. The slide 43 has a covering of screen material 46 secured thereto and in like manner the slide 44 has a covering of screen material 47 attached thereto. Also slidably mounted upon the slide member 43 in guideways 48 provided therefor is a shutter 49 which is constructed of waterproof material, and said shutter may be moved within the guideways 48 into any desired position upon the extensible covering 42 to provide a protection against wind and rain.

A back rest 50 is pivotally mounted at 26 to the body member 1 and said back rest will swing forwardly when the extension 27 is located in its open position.

Located within the body member 1 at the rear end thereof is a main back rest 51 having side members 52, each of which is provided with a pin 53 which projects into a groove 54 provided in the inner wall 3 of the body member 1. The side portions 52 of the back rest 51 also have slots 55 and 56 extending downwardly from their upper edges, and an auxiliary back rest 57 is provided with pins 58 which may project into either of the slots 55 and 56 for the purpose of varying the height and inclination at which the auxiliary back rest will be supported upon the side members 52 of the main back rest 51.

The general operation of the baby carriage body hereinbefore specifically described is as follows:—If no protection whatever is required for the occupant of the baby carriage, the entire hood 6 may be rocked upon its pivot 5 and be located within the space 4 between the walls 2 and 3 of the body member 1. If, however, protection against flies and mosquitoes is all that is required, the hood 6 is opened as indicated in Fig. 3, at which time the slides 17 and 19 may be removed entirely from the hood, or said slides may be positioned one beneath the other and the light and air will enter the baby carriage through either one of the sections of screen material 14 or 16. At the same time the slides 24 at the side of the hood may be adjusted to allow ventilation to enter the baby carriage through the screen material of the slides 22, or the slides 24 may be positioned to shut out the light to the interior of the baby carriage through said screen material.

When the extensible covering 42 for the upper forward portion of the body member 1 is not in use, it is intended that it shall be located in its collapsed position within the space 30 of the extension 27. The covering 42 may be used when the extension 27 is located in either its open or its closed positions, and light and ventilation may enter the interior of the body member 1 through the screen material of said covering, or air and light may be excluded therefrom by utilizing the shutter 49.

When the extension 27 is located in its open position, ventilation may enter the body member 1 through the screen material 33 provided at the sides of said extension. The auxiliary back rest 57 may be located as illustrated in Fig. 3, or the pin 58 of said back rest may be located at the bottom of the groove 56. The back rest 50 will swing forwardly when the extension 27 is located in its open position.

While I have not illustrated the springs and wheels for the baby carriage in the drawings, it is evident that they may be attached in any suitable manner to the body member 1, and it is, furthermore, evident that the device may be used as a cradle if it is so desired.

I claim:—

1. A baby carriage comprising, in combination, a body member embodying therein an outer and inner wall having a space therebetween, a hood of open mesh fabric pivotally attached to said body member and covering the same at one end thereof, said hood also being adapted to be moved from above the body member into the space between the walls thereof, and a transparent arcuate member slidably mounted on said hood and positioned parallel with said fabric.

2. A baby carriage comprising, in combination, a body member embodying therein an outer and inner wall having a space therebetween, a hood of open mesh fabric pivotally attached to said body member and covering the same at one end thereof, said hood also being adapted to be moved from above the body member into the space between the walls thereof, a transparent arcuate member slidably mounted on said hood and positioned parallel with said fabric and a waterproof arcuate member slidably mounted upon said hood and positioned parallel with said fabric and transparent member.

In testimony whereof I have hereunto set my hand.

EUGENE HAMEL.